United States Patent [19]
Hoult

[11] Patent Number: 5,050,485
[45] Date of Patent: Sep. 24, 1991

[54] CUSHIONING OF PISTON SIDETHRUST IN GAS LUBRICATED ENGINE

[75] Inventor: David P. Hoult, Wayland, Mass.

[73] Assignee: Massachusetts Institute of Technology, Cambridge, Mass.

[21] Appl. No.: 33,588

[22] Filed: Apr. 1, 1987

[51] Int. Cl.$^5$ .............................................. F01B 31/00
[52] U.S. Cl. ................................... 92/126; 92/162 R; 92/127; 92/172; 92/208; 123/193 P
[58] Field of Search ...................... 92/162 R, 192, 208, 92/DIG. 2, 126, 127, 174, 235, 243, 247, 154, 159, 160; 123/193 P; 277/3, 27, 203, 204, 216

[56] References Cited

U.S. PATENT DOCUMENTS

| | | | |
|---|---|---|---|
| 1,944,935 | 1/1934 | Jardine | 92/126 |
| 2,662,515 | 12/1953 | Bodine, Jr. | 123/193 P X |
| 3,521,531 | 7/1970 | Kaesemodel | 92/208 X |
| 4,068,563 | 1/1978 | Ryan et al. | 92/208 X |
| 4,111,104 | 9/1978 | Davison et al. | 92/127 |
| 4,124,978 | 11/1978 | Wagner | 92/162 R X |
| 4,178,899 | 12/1979 | Julich | 123/193 P |
| 4,540,185 | 9/1985 | Hoult | 277/174 |
| 4,681,326 | 7/1987 | Kubo | 277/27 |

FOREIGN PATENT DOCUMENTS

| | | | |
|---|---|---|---|
| 767555 | 11/1952 | Fed. Rep. of Germany | 92/208 |
| 3022858 | 12/1981 | Fed. Rep. of Germany | 123/193 P |

OTHER PUBLICATIONS

"Adiabatic Engines and Systems", SP-700, Society of Auto-Engineers (SAE), Feb., 1987.

Primary Examiner—Edward K. Look
Assistant Examiner—Thomas Denion

[57] ABSTRACT

Gas cushions are maintained between a piston and a cylinder of a gas lubricated reciprocating engine which are effective in retarding the approach of the piston to the cylinder wall under the thrust of side forces from the connecting rod. The cushion are maintained by viscous flow forces for sufficient time exceed a half cycle of crankcase rotation.

4 Claims, 6 Drawing Sheets

CUSHIONING OF PISTON SIDETHRUST IN GAS LUBRICATED ENGINE

BRIEF SUMMARY OF THE INVENTION

This invention relates to gas lubricated reciprocating engines and particularly to cushioning the sidethrust on the pistons of such engines so that the pistons do not rub against their cylinder walls.

Sidethrust is developed on a piston whenever the connecting rod connected to the piston is stressed and off center. This side thrust tends if not resisted to push the piston to the cylinder wall thereby causing excessive wear or damage to the piston or cylinder wall. According to the invention, a gas cushion is maintained between the piston and the cylinder wall which is effective in resisting the piston sidethrust for a period long enough to prevent the piston from reaching the cylinder wall during any engine cycle under the engine's normal operations.

DETAILED DESCRIPTION

Figure 1:
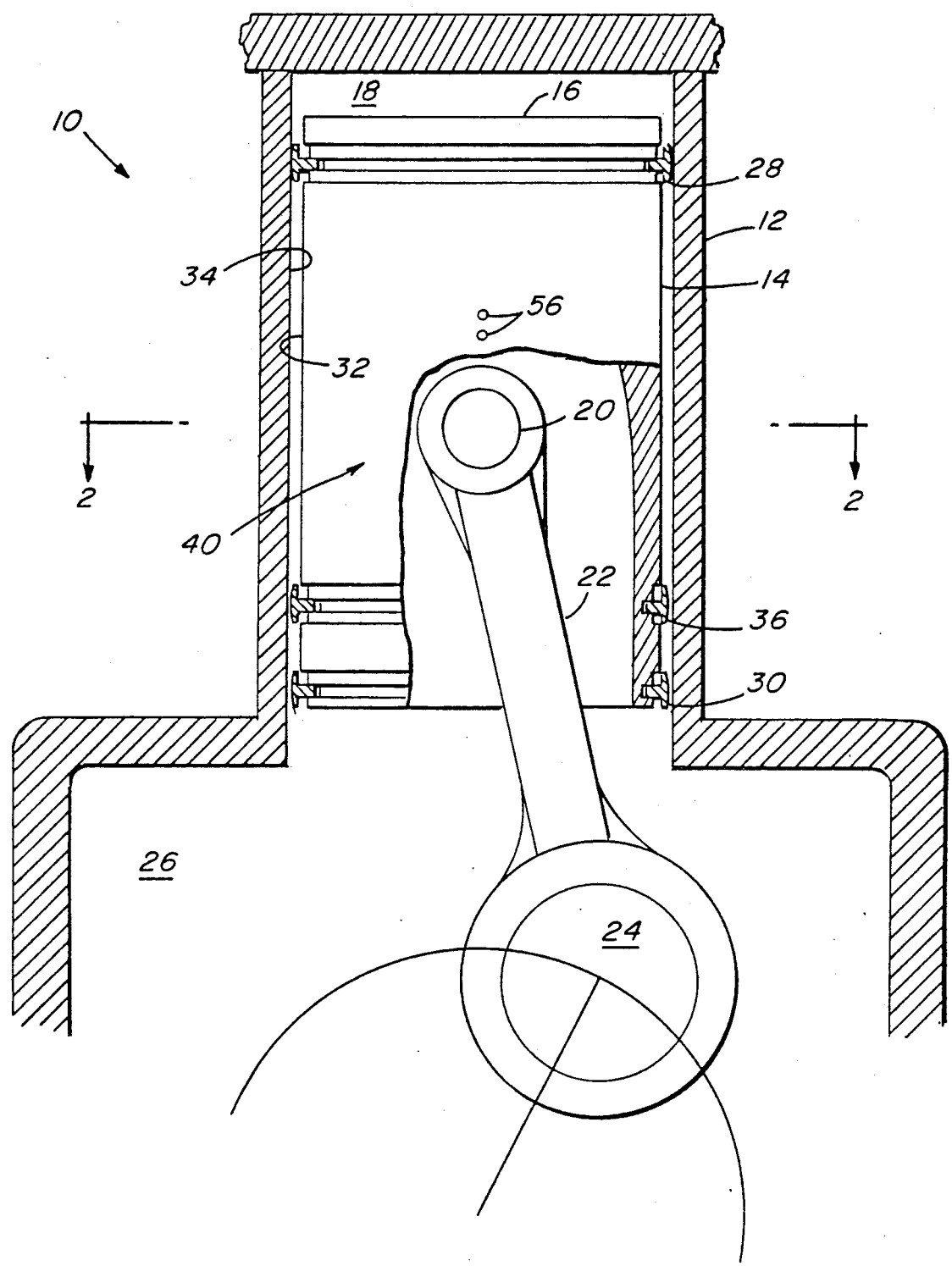
FIG. 1 shows a portion of a gas lubricated reciprocating engine with a piston and cylinder according to the invention.
Figure 2:
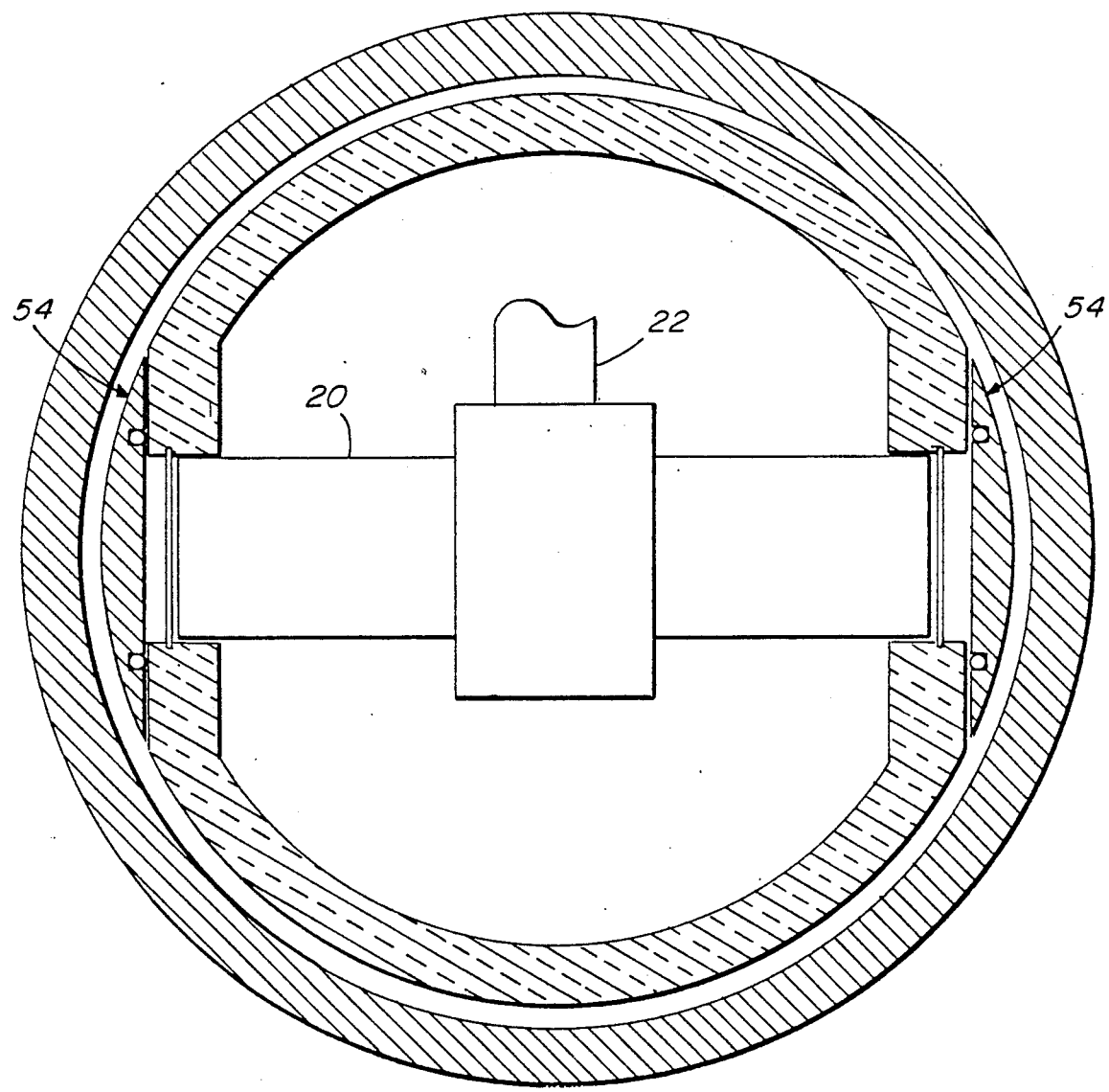
FIG. 2 shows a cross-sectional view of the piston of FIG. 1 on section 2—2.

The invention may be described in more detail with reference to the drawing. We will suppose that the piston and cylinder are oriented as shown in FIG. 1 and use herein the terms "top", "right", "front" etc. as relating to the view of FIG. 1. Gas lubricated reciprocating engine 10, which may be an internal combustion engine, has cylinder 12 with piston 14 fitting inside. Top surface 16 of piston 14 is adjacent to and forms part of the boundary of expansion chamber 18, with inner wall 34. Skirt 32 of piston 14 extends downward from top surface 16, facing inner cylinder wall 34. Piston 14 is connected through wrist pin 20 and connecting rod 22 to crankshaft 24 situated in crankcase chamber 26. Pin seal 54 prevents leakage along pin 20 to crankcase chamber 26. Piston 14 is fitted with crown seal 28 extending around the piston and positioned near top surface 16. Bottom seal 30 similarly extends around the piston and is positioned near the bottom of piston skirt 32 so that a major portion 40 of skirt 32 lies between the crown and bottom seals. Intermediate seal 36 is positioned between crown seal 28 and bottom seal 30 below the level of pin 20 and nearer to bottom seal 30. Seals 28, 30, 36 are gas lubricated seals and may advantageously be according to the design shown in my U.S. Pat. No. 4,540,185.

Figure 3:
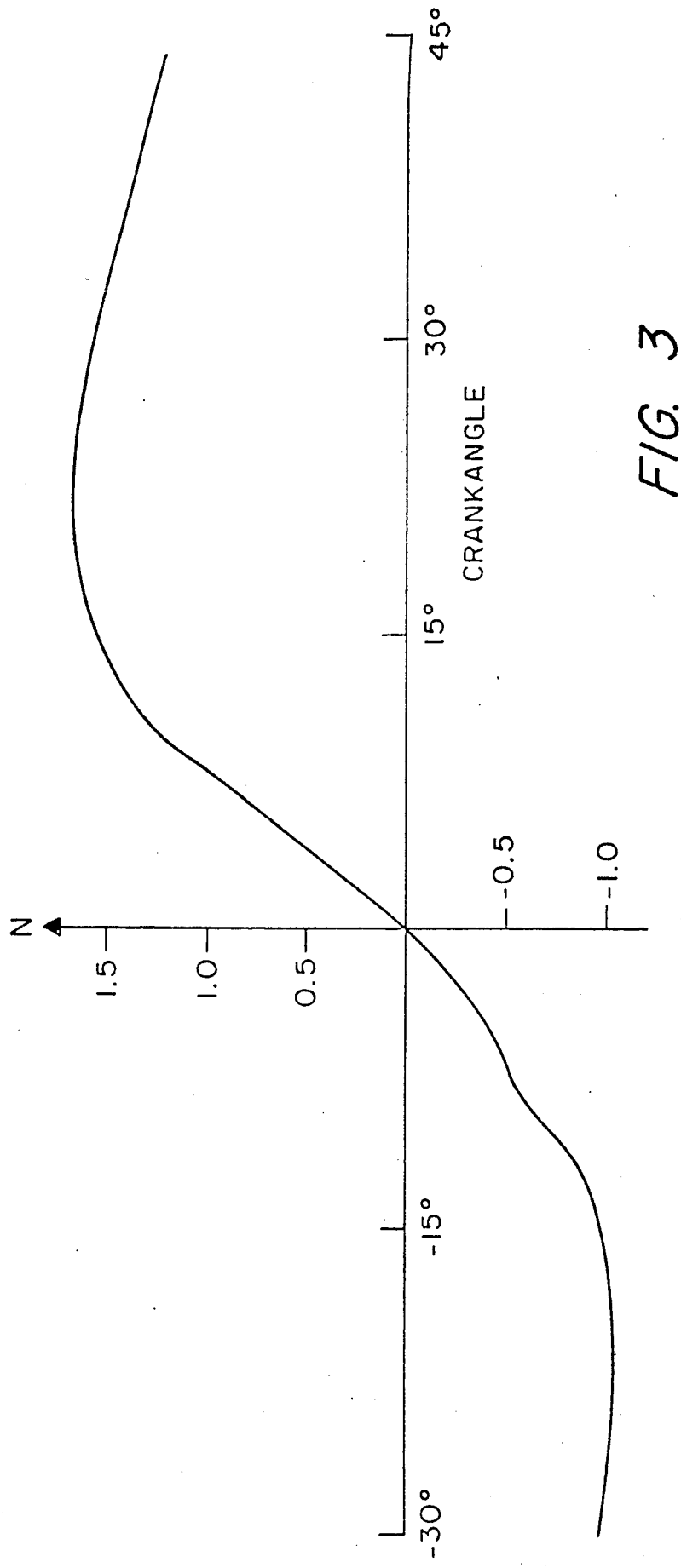
FIG. 3 shows a plot of sidethrust (in normalized form) as a function of crankangle for the piston of FIG. 1.

In operation, piston 14 is subjected during certain portions of the engine operating cycle to a sidethrust component of force from connecting rod 22. In general this force depends both on the pressure in expansion chamber 18 and on the position of crankshaft 24. The variation of the sidethrust, expressed in a normalized form, as a function of crankangle is shown in FIG. 3 for a typical case. In particular it may noted that a continuously exerted sidethrust in one direction never lasts longer than the period for one half of a crankshaft revolution.

Figure 4:
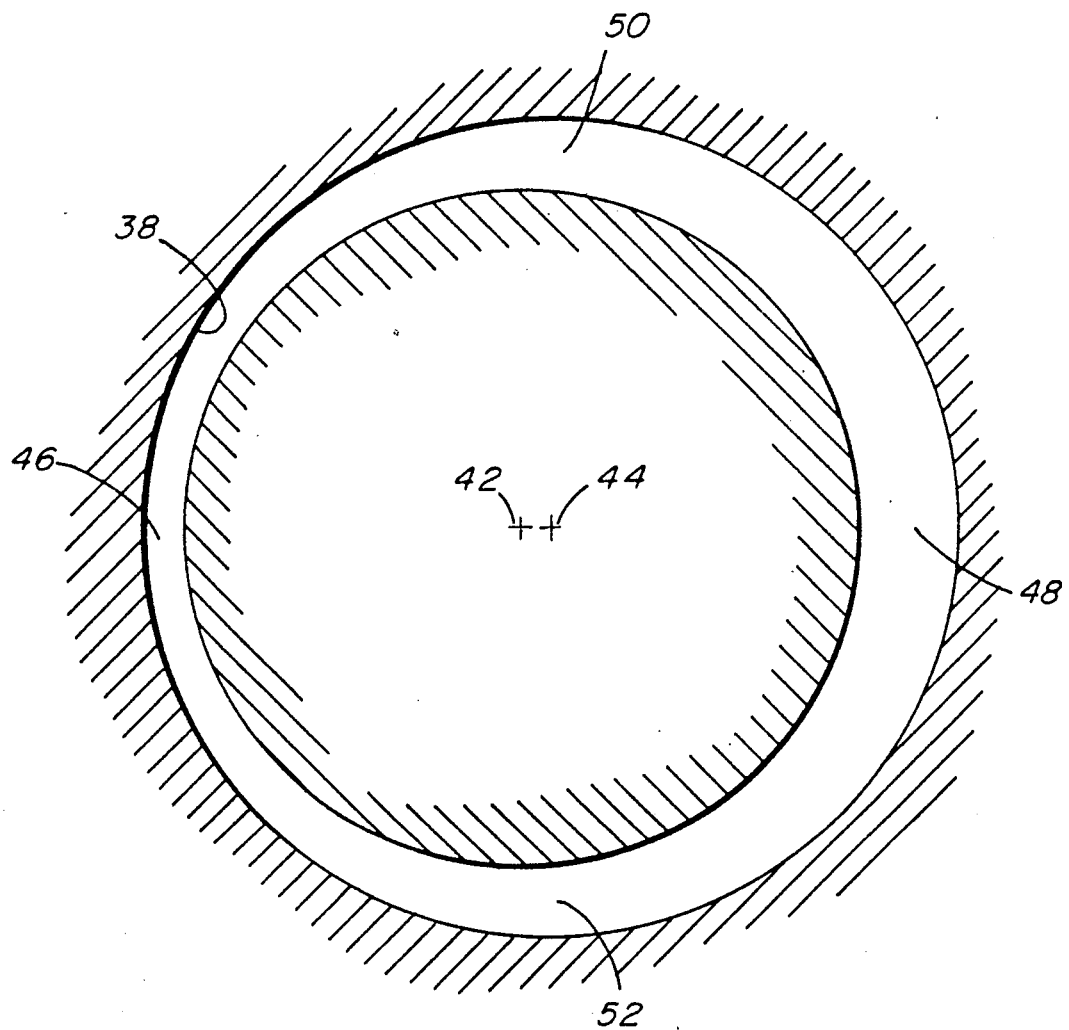
FIG. 4 shows with exaggerated clearances the outlines of the piston and cylinder of FIG. 1 to assist in explanation of the invention.

As shown particularly in FIG. 4, when a sidethrust (say towards the left) is applied to piston 14, it moves leftward so that its center 42 is displaced from the center 44 of cylinder 12. (Clearances and displacements are greatly exaggerated in FIG. 4.) The excursion of piston 14 away from the cylinder center position would ultimately be limited by the piston jamming wall 38 of the cylinder. The jamming may occur by direct contact of the piston to the cylinder wall, or if the grooves for the seals 28,30 do not fully admit the seals, the seals may be jammed against the cylinder wall while the piston is jammed against the seals. In any case there is a limit to the excursion range of the piston from the concentric position, and when the piston excursion reaches this limit injurious or at least undesirable frictional effects begin.

As piston 14 moves to the say left within its excursion range under the urging of a sidethrust, the volume of thrust side cushion chamber 46, which may be considered to be the space in the left clearance (that is, between the crown and bottom seals, between the piston and the wall, and including about 90 deg. of the piston circumference centered around the leftmost point) will be reduced. At the same time the volume of anti-thrust side cushion chamber 48 (correspondingly defined around the rightmost point of the piston circumference) will increase. These volume changes will be accompanied by flow of gas from left to right in communicating passages 50 and 52, (correspondingly defined around the back and front of the piston circumference). As a result of this gas flow a pressure difference develops between cushion chamber 46 and cushion chamber 48, with the pressure greater in the chamber approached by the piston than in the chamber from which the piston is receding. This pressure difference opposes and retards the excursion of the piston towards the left wall.

By properly interrelating certain parameters of the piston design, the retardation of the piston's excursion toward the cylinder can be made sufficient so that for all conditions within the operating range of the engine the piston does not reach its excursion limit within a period of a quarter of a crankshaft revolution. That is to say, the period for the piston to make an excursion to the wall is made to be greater than the duration of any intermittently applied sidethrust.

The foregoing discussion has considered only the translational motion of the piston. The piston is, however, free to rotate around the wrist pin. Such a rotation could cause one end of the piston to hit the cylinder wall even though the whole length of the piston skirt did not. Accordingly, the center of the wrist pin is advantageously located at the level of the centroid of the pressure difference between the cushion chambers. This disposition eliminates any moment tending to rotate the piston.

Design parameters which are important for determining the excursion period of the piston include the following: piston/cylinder diameter, distance between crown and bottom seals, nominal clearance between piston skirt and cylinder wall, clearance between seals and cylinder wall, excursion range of piston, average pressure on piston skirt between crown and bottom seals, position of wrist pin. Additional seals between the crown and bottom seals may also be introduced to influence the mean pressure along the height of the piston skirt. Bleed holes and specially shaped seals may be used to modify the volumes of the cushion chambers and the pattern of flow therebetween.

As further illustration of the invention, consider an engine having the following dimensions and operating conditions.

| specification | value | symbol |
| --- | --- | --- |
| connecting rod length | 0.2616 m | |
| crank radius | 0.0825 m | |
| engine speed | 5.6 radians/s | w |
| compression ratio | 14.5 | |
| cylinder/piston radius | 0.065 | R |
| cycle peak pressure | 10200 KPa | |
| intake manifold pressure | 202 KPa | |
| exhaust manifold pressure | 169 KPa | |
| crankcase pressure | 101 KPa | Pc |
| height of crown land | 1.20 cm | |
| height of second land | 6.5 cm | L2 |
| height of third land | 1.5 cm | L3 |
| piston clearance | 0.01 cm | h |
| seal clearance | 3 um | |
| crown land temp | 573 K. | |
| second land temp | 553 K. | |
| third land temp | 535 K. | |

The specifications given are typical of a heavy diesel engine and the leak rate by the gas lubricated seals are estimated to be about the same as for a conventional oil lubricated engine.

Figure 5:
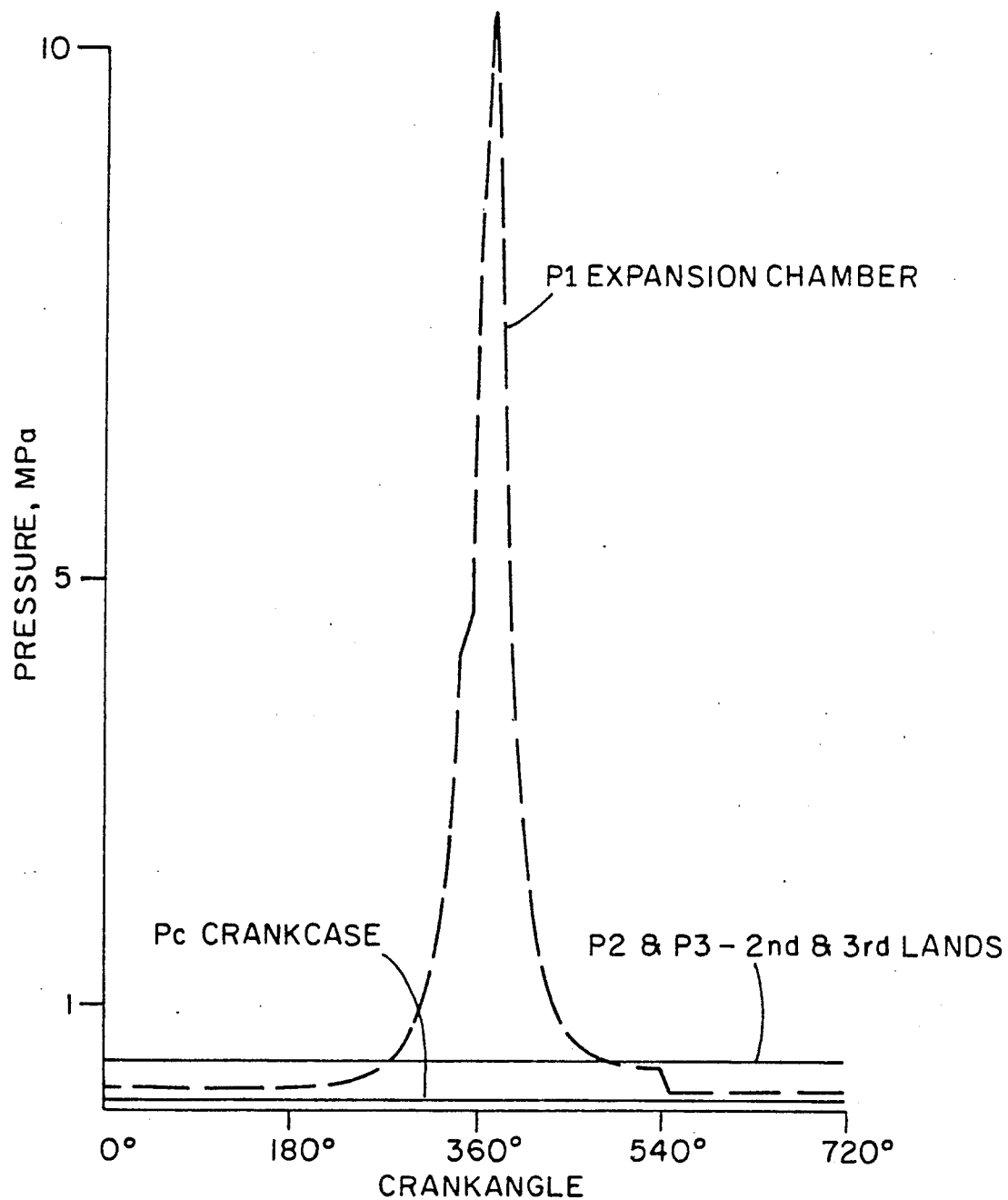
FIG. 5 shows a plot of several pressures occurring in spaces adjacent to the piston of FIG. 1.

The calculated pressures on the several lands as a function of crank angle is shown in FIG. 5. The calculation of such pressure plots is routine to those skilled in the engine design art, and needs no further explanation. (The pressures are azimuthly averaged.) It may be noted that the pressures on the second and third lands, P2 and P3 are substantially above the crankcase pressure Pc, and are virtually independent of the crank angle. The use of an intermediate seal is largely responsible for the considerable pressure on the second and third lands.

The sidethrust is now calculated from the expansion chamber pressure and the geometry of the piston, connecting rod, and crankshaft according to well known formulas. It is convenient to represent the sidethrust in the form of a normalized variable N obtained by dividing the sidethrust by the expression $$3.14 R(L2+L3)(P2-Pc)$$

(The value P2 is here used as the pressure over the whole land area between the crown and bottom seals in view of the insignificant difference between P2 and P3.) A plot of N is shown in FIG. 3.

Estimation of the lateral motion of the piston is facilitated by computation of a squeeze parameter S applicable to the motion of viscous fluids squeezed between walls.

$$S = 12(3.14) v f R(L2+L3) P2/h^2$$

(where v is kinetic viscosity, and f is a frequency characteristic of the application of a load.) The parameter f may for the present calculation be estimated as 0.1 w corresponding to the more rapid change of the sidethrust as compared to the crankshaft rotation. This then gives a value for S applicable to the transverse motion of the piston of S=488.

Using well known formulas, (see for example W. A. Gross et al: Fluid Film Lubrication, John Wiley & Sons, 1980, pg 643ff) gives $$N = -2k(dh/h)S$$

where dh is the excursion of the piston towards the cylinder wall, and the factor "2" arises to account for effects of both the cushion chambers. The coefficient k is taken as 0.0351 from Gross's Table 8-2.1. Using the above expression for N with reference to FIG. 3 shows that the maximum value of the excursion dh is about 4.5 um, a very acceptable value indicating that, for the exemplary engine design and operating conditions, the cushion chambers will be effective in holding the piston away from the cylinder wall.

The above expressions for N and S imply that the excursion dh is proportional to $h^3$ and inversely proportional to the average pressure between the crown and bottom seals and to the distance between crown and bottom seals, justifying the values chosen for the exemplary analysis as desirable.

Operating conditions and specifications for engines will of course vary from those of the above example, but those skilled in the art of piston design will readily recognize how the invention as described and exemplified above is to be applied in specific situations to achieve effective cushioning of the piston away from the cylinder wall.

Figure 6:
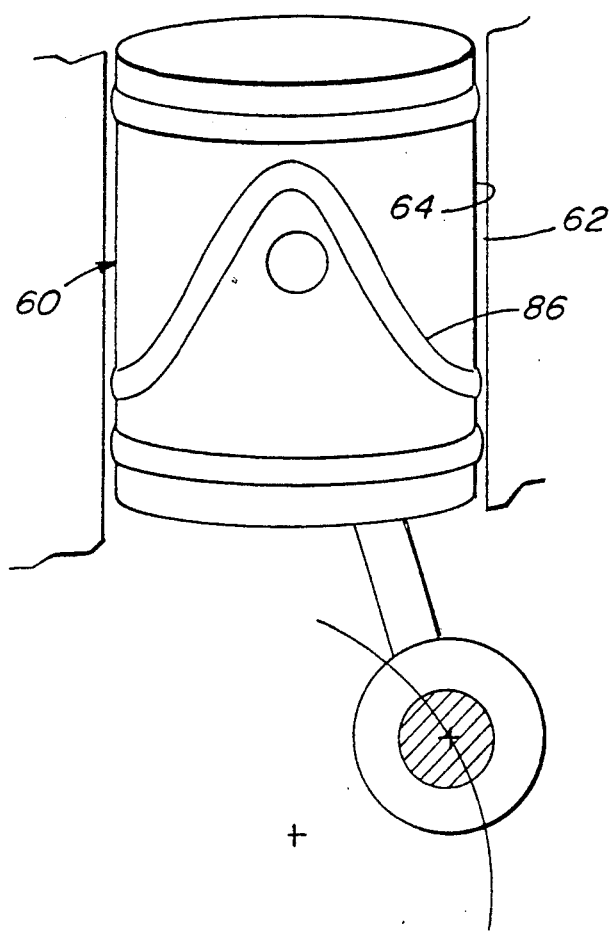
FIG. 6 shows a piston with a specially shaped seal which, according to the invention, may be used alternatively to the piston of FIG. 1.

Certain additional design features may be used to enhance the cushioning by the cushion chambers. These include the provision of bleed holes 56 placed at the front and back of the piston between the crown and bottom seals which desirably shape the azimuthal pressure distribution of the cushion chambers. Additionally, complexly curved gas lubricated seal 86 may be positioned around the piston as shown in FIG. 6. The curved seal approaches the crown seal more closely in the region of the front and back of the piston than in the region of the left and right of the piston, thus constricting the passages 58, communicating between cushion chambers 60 and 62 while leaving the chambers with a large area against the piston skirt 64.

What is claimed is:

1. In a gas lubricated reciprocating engine, a cylinder and a piston fitting therein with clearance, said piston having a top surface adjacent to a combustion chamber of said engine, and a cylindrical skirt surface extending downward from the top surface and facing an inner wall of said cylinder, said piston connected through a wrist pin and connecting rod to a crankshaft of said engine situated in a crankcase chamber, said piston having a range with a limit for travel from a position concentric with said cylinder wall to a position where it jams against said cylinder wall, said piston comprising a gas lubricated crown seal extending around the piston and positioned near the combustion chamber, a gas lubricated bottom seal extending around the piston and positioned below said wrist pin and near the bottom of the skirt surface so that a major portion of said skirt surface lies between said top and bottom seals, a thrust side cushion chamber being defined by said crown seal, said bottom seal, the cylinder wall, and a portion of the skirt surface of the piston situated on the thrust side of the piston between the top and bottom seals, an anti-thrust side cushion chamber being defined by said crown seal, said bottom seal, the cylinder wall, and a portion of the skirt surface of the piston situated on the anti-thrust side of the piston between the top and bottom seals, said thrust side and said anti-thrust side cushion chambers communicating through passages defined by said crown seal, said bottom seal, the cylinder wall, and the portions of the skirt surface of the piston situated on the front and back sides of the piston between the crown and bottom seals, wherein diameter of the piston, clearance between the piston and the cylinder wall, clearance between the gas lubricated seals and the cylinder wall, area of piston skirt between said gas lubricated seals, the range of radial motion of the piston, and average pressure in the cushion chambers are mutually interrelated so that an average pressure is maintained in the cushion chambers sufficiently greater than that in the crankcase chamber to be effective in producing cushioning forces, and so that differential pressures between said cushion chambers accompanying flow of gas from one of said cushion chambers to the other of said cushion chambers induced by an excursion of the piston toward the cylinder wall in response to a horizontal operating force exerted on the piston by the connecting rod retard motion of the piston to prevent piston excursion to said limit of range for a period of $\frac{1}{2}$ crankshaft rotation throughout the operating range of said engine, said piston having an additional gas lubricated seal controlling the average gas pressure between said bottom and crown gas lubricated seals.

2. In a gas lubricated reciprocating engine, a cylinder and a piston fitting therein with clearance, said piston having a top surface adjacent to a combustion chamber of said engine, and a cylindrical skirt surface extending downward from the top surface and facing an inner wall of said cylinder, said piston connected through a wrist pin and connecting rod to a crankshaft of said engine situated in a crankcase chamber, said piston having a range with a limit for travel from a position concentric with said cylinder wall to a position where it jams against said cylinder wall, said piston comprising a gas lubricated crown seal extending around the piston and positioned near the combustion chamber, a gas lubricated bottom seal extending around the piston and positioned below said wrist pin and near the bottom of the skirt surface so that a major portion of said skirt surface lies between said top and bottom seals, a thrust side cushion chamber being defined by said crown seal, said bottom seal, the cylinder wall, and a portion of the skirt surface of the piston situated on the thrust side of the piston between the top and bottom seals, an anti-thrust side cushion chamber being defined by said crown seal, said bottom seal, the cylinder wall, and a portion of the skirt surface of the piston situated on the anti-thrust side of the piston between the top and bottom seals, said thrust side and said anti-thrust side cushion chambers communicating through passages defined by said crown seal, said bottom seal, the cylinder wall, and the portions of the skirt surface of the piston situated on the front and back sides of the piston between the crown and bottom seals, wherein diameter of the piston, clearance between the piston and the cylinder wall, clearance between the gas lubricated seals and the cylinder wall, area of piston skirt between said gas lubricated seals, the range of radial motion of the piston, and average pressure in the cushion chambers are mutually interrelated so that an average pressure is maintained in the cushion chambers sufficiently greater than that in the crankcase chamber to be effective in producing cushioning forces, and so that differential pressures between said cushion chambers accompanying flow of gas from one of said cushion chambers to the other of said cushion chambers induced by an excursion of the piston toward the cylinder wall in response to a horizontal operating force exerted on the piston by the connecting rod retard motion of the piston to prevent piston excursion to said limit of range for a period of $\frac{1}{2}$ crankshaft rotation throughout the operating range of said engine, said piston having bleed holes at positions near the plane of the pin and piston axes communicating between the space between the cylinder and the piston and the crankcase chamber for modifying the azimuthal pressure distribution in said cushion chambers.

3. In a gas lubricated reciprocating engine, a cylinder and a piston fitting therein with clearance, said piston having a top face adjacent to a combustion chamber of said engine, and a cylindrical skirt surface extending downward from the top surface and facing an inner wall of said cylinder, said piston connected through a wrist pin and connecting rod to a crankshaft of said engine situated in a crankcase chamber, said piston having a range with a limit for travel from a position concentric with said cylinder wall to a position where it jams against said cylinder wall, said piston comprising a gas lubricated crown seal extending around the piston and positioned near the combustion chamber, a gas lubricated bottom seal extending around the piston and positioned below said wrist pin and near the bottom of the skirt surface so that a major portion of said skirt surface lies between said top and bottom seals, a thrust side cushion chamber being defined by said crown seal, said bottom seal, the cylinder wall, and a portion of the skirt surface of the piston situated on the thrust side of the piston between the top and bottom seals, an anti-thrust side cushion chamber being defined by said crown seal, said bottom seal, the cylinder wall, and a portion of the skirt surface of the piston situated on the anti-thrust side of the piston between the top and bottom seals, said thrust side and said anti-thrust side cushion chambers communicating through passages defined by said crown seal, said bottom seal, the cylinder wall, and the portions of the skirt surface of the piston situated on the front and back sides of the piston between the crown and bottom seals, wherein diameter of the piston, clearance between the piston and the cylinder wall, clearance between the gas lubricated seals and the cylinder wall, area of piston skirt between said gas lubricated seals, the range of radial motion of the piston, and average pressure in the cushion chambers are mutually interrelated so that an average pressure is maintained in the cushion chambers sufficiently greater than that in the crankcase chamber to be effective in producing cushioning forces, and so that differential pressures between said cushion chambers accompanying flow of gas from one of said cushion chambers to the other of said cushion chambers induced by an excursion of the piston toward the cylinder wall in response to a horizontal operating force exerted on the piston by the connecting rod retard motion of the piston to prevent piston excursion to said limit of range for a period of ½ crankshaft rotation throughout the operating range of said engine, said piston having a complexly curved gas lubricating seal extending around the piston, said complexly curved seal approaching said crown seal more closely in regions near the plane of the pin and piston axes than in the regions 90 degrees around the piston therefrom.

4. In a gas lubricated reciprocating engine, a cylinder and a piston fitting therein with clearance, said piston having a top surface adjacent to a combustion chamber of said engine, and a cylindrical skirt surface extending downward from the top surface and facing an inner wall of said cylinder, said piston connected through a wrist pin and connecting rod to a crankshaft of said engine situated in a crankcase chamber, said piston having a range with a limit for travel from a position concentric with said cylinder wall to a position where it jams against said cylinder wall, said piston comprising a gas lubricated crown seal extending around the piston and positioned near the combustion chamber, a gas lubricated bottom seal extending around the piston and positioned below said wrist pin and near the bottom of the skirt surface so that a major portion of said skirt surface lies between said top and bottom seals, a thrust side cushion chamber being defined by said crown seal, said bottom seal, the cylinder wall, and a portion of the skirt surface of the piston situated on the thrust side of the piston between the top and bottom seals, an anti-thrust side cushion chamber being defined by said crown seal, said bottom seal, the cylinder wall, and a portion of the skirt surface of the piston situated on the anti-thrust side of the piston between the top and bottom seals, said thrust side and said anti-thrust side cushion chambers communicating through passages defined by said crown seal, said bottom seal, the cylinder wall, and the portions of the skirt surface of the piston situated on the front and back sides of the piston between the crown and bottom seals, wherein diameter of the piston, clearance between the piston and the cylinder wall, clearance between the gas lubricated seals and the cylinder wall, area of piston skirt between said gas lubricated seals, the range of radial motion of the piston, and average pressure in the cushion chambers are mutually interrelated so that an average pressure is maintained in the cushion chambers sufficiently greater than that in the crankcase chamber to be effective in producing cushioning forces, and so that differetial pressures between said cushion chambers accompanying flow of gas from one of said cushion chambers to the other of said cushion chambers induced by an excursion of the piston toward the cylinder wall in response to a horizontal operating force exerted on the piston by the connecting rod retard motion of the piston to prevent piston excursion to said limit of range for a period of ½ crankshaft rotation throughout the operating range of said engine, including a pin sealing means for preventing flow of gas along the pin between outside the skirt surface and the crankcase chamber.

* * * * *